United States Patent [19]

Handa et al.

[11] Patent Number: 4,979,991
[45] Date of Patent: Dec. 25, 1990

[54] PRODUCTION PROCESS OF PIGMENT

[75] Inventors: Junichi Handa, Toyota; Hiroshi Itou, Ichinomiya; Taketoshi Minohara, Toyota; Yoshio Takagi, Nagoya, all of Japan

[73] Assignee: Toyota Jidosha Kabushiki Kaisha, Japan

[21] Appl. No.: 408,250

[22] Filed: Sep. 18, 1989

[30] Foreign Application Priority Data

Sep. 19, 1988 [JP] Japan ............................. 63-234616

[51] Int. Cl.$^5$ ............................................. C04B 11/20
[52] U.S. Cl. ................................. 106/417; 106/440; 106/441; 106/453
[58] Field of Search ............... 106/440, 441, 442, 417, 106/453, 1.23, 1.24; 427/305, 437, 438, 419.2, 162, 54.1

[56] References Cited

U.S. PATENT DOCUMENTS

| | | | |
|---|---|---|---|
| 4,038,099 | 7/1977 | DeLuca et al. | 106/291 |
| 4,134,776 | 1/1979 | Rieger et al. | 106/291 |
| 4,828,623 | 5/1989 | Nita et al. | 106/450 |
| 4,867,794 | 9/1989 | Ambrosius et al. | 106/417 |

FOREIGN PATENT DOCUMENTS

| | | |
|---|---|---|
| 2522527 | 12/1975 | Fed. Rep. of Germany . |
| 3235017A1 | 3/1984 | Fed. Rep. of Germany . |
| 78265 | 3/1984 | Japan . |
| 3345 | 12/1985 | Japan . |
| 265795 | 1/1987 | Japan . |

*Primary Examiner*—William R. Dixon, Jr.
*Assistant Examiner*—Chris Gallo
*Attorney, Agent, or Firm*—Finnegan, Henderson, Farabow, Garrett & Dunner

[57] ABSTRACT

A production process of pigment according to this invention comprises the steps of: a first step of forming an inorganic compound coating layer on the entire surfaces of scaly substrates made of ceramic; a second step of forming metallic glossy dots on the surfaces of the inorganic compound coating layer in a scattered manner by an electroless plating, and the metallic glossy dots occupying from 0.05 to 95% of the surfaces of the inorganic compound coating layer with respect to the total surface area of the inorganic compound coating layer; and a third step of irradiating ultraviolet ray on particles formed by the second step. The impurities and the like, which adversely affect the color hue of the pigment, have been discolored or faded away by the ultraviolet ray irradiation in the third step. Accordingly, the pigment having good weather resistance can be produced readily and stably by the present invention.

10 Claims, 2 Drawing Sheets

PRODUCTION PROCESS OF PIGMENT

BACKGROUND OF THE INVENTION

1. Field of the Invention

This invention relates to a production process for producing a novel pigment generating colors by light interference and light scattering. The weather resistance of the novel pigment can be improved remarkably by the production process according to this invention.

2. Related Art Statement

A pearl mica pigment has been known recently. The pearl mica pigment comprises mica and titanium dioxide layer coated on the surface of the mica, and generates pearl like glossiness by light interference. Various interference colors can be obtained by varying the thickness of the titanium dioxide layer. In addition, Japanese Unexamined Patent Publication (KOKAI) No. 78265/1984 and Japanese Examined Patent Publication (KOKOKU) No. 3345/1985 disclose pigments further comprise chromium compound deposited on the surface of the titanium dioxide layer of the pearl mica pigment, thereby improving the weather resistance of the pigments.

A paint film formed by a paint employing the pearl mica pigment, however, does not offer metallic glossiness, nor is appropriate for a metallic paint film application. Further, when compared with a metallic paint film containing aluminum powders, the paint film comprising the pearl mica pigment exhibits small brightness difference between the brightness viewed at the front with respect to the paint film and the brightness viewed at an oblique angle with respect to the paint film, and thus has problems resulting from the so-called inferior flip-flop characteristic. Accordingly, the inventors of this invention applied a patent for a novel pigment by Japanese Patent Application No. 265795/1987 which has not been published when the application of the present invention is filed. The novel pigment comprises a pearl mica pigment and metal or alloy glossy dots formed on the surface of the pearl mica pigment in a scattered manner, and the metal or alloy glossy dots occupying from 0.05 to 95% of the surfaces of the pearl mica pigment with respect to the total surface area of the pearl mica pigment. A metallic paint film formed by a paint employing the novel pigment offers a glossy feeling resulting from the metal or alloy glossy dots, an interference color resulting from light interference, a scattering color resulting from light reflection and scattering, and a superior flip-flop characteristic.

The inventors of this invention, however, have found that the weather resistance of the novel pigment is not satisfactory enough in the course of the research and development of the novel pigment. For instance, the novel pigment, in which silver is deposited by an electroless plating method on the surfaces of the pearl mica pigment in a scattered manner, usually gives a blue color generation, but sometimes gives intense yellowish color generation due to the fluctuations of the production conditions. When the inventors of this invention conducted an accelerated weather resistance test on a paint film, which was formed by a paint employing such novel pigment, by using a QUV apparatus for 500 hours, the yellowish color generation of the paint film had faded away during the test. The inventors of this invention also found that this phenomenon occurred especially in the novel pigments giving intense yellowish color generation which has the "b" value in Hunter's "Lab" value deviating from −2 in the plus direction, i.e., −2 or more, or from 1 to 2 in $\Delta b$ value.

SUMMARY OF THE INVENTION

In this invention, the yellowish color generation causing the discoloration is removed in the course of the production process of the novel pigment. This is therefore a principle of this invention for solving the above-mentioned problems.

A production process of pigment according to this invention comprises the steps of: a first step of forming an inorganic compound coating layer on the entire surfaces of scaly substrates made of ceramic; a second step of forming metallic glossy dots on the surfaces of the inorganic compound coating layer in a scattered manner by an electroless plating, and the metallic glossy dots occupying from 0.05 to 95% of the surfaces of the inorganic compound coating layer with respect to the total surface area of the inorganic compound coating layer; and a third step of irradiating ultraviolet ray on particles formed by the second step.

Mica, molybdenum disulfide and the like may be employed for the scaly substrate made of ceramic. The mica is especially recommended in view of cost. The mica may be natural mica, for example muscovite, biotite, phlogopite and the like, and synthetic mica. When the mica is adapted to a pigment for a paint, the thickness thereof may fall in the range of from 500 to 1000 angstroms and the length thereof may fall in the range of from 3 to 50 micrometers.

The first step is a process of forming an inorganic compound coating layer on the above-mentioned substrate. As for inorganic compound constituting the inorganic compound coating layer, at least one or more of titanium dioxide, iron oxide, aluminum hydroxide, chromium hydroxide, chromium phosphate and the like may be selected and employed.

For instance, when coating the scaly substrates with titanium dioxide, the coating may be performed by the titanyl sulfate method as set forth in the U.S. Pat. No. 4,038,099. In the titanyl sulfate method, an acidic titanyl sulfate solution is added to an aqueous slurry containing the scaly substrates treated with tin compound beforehand. Then, the mixture is heated to the temperature of from 70° to 110 °C., and the titanyl sulfate is hydrolyzed, thereby coating the surfaces of the scaly substrates with hydrate amorphous titanium hydroxide. Then, the scaly substrates are filtered and calcined, and thereby a titanium dioxide layer is formed on the surfaces of the scaly substrates. The titanium dioxide layer may comprise the hydrate thereof. In the case where the mica is employed for the scaly substrates, this first step may be omitted by employing commercially available pearl mica pigments of various kinds.

In addition, when coating the scaly substrates with chromium compound, the coating may be performed by hydrolyzing and depositing chromium hydroxide out of soluble chromium salt, such as chromium chloride, chromium sulfate and the like, as set forth in Japanese Examined Patent Publication (KOKOKU) No. 3345/1985, or by precipitating chromium hydroxide, chromium carbonate, chromium phosphate or chromium methacrylate complex out of a solution containing iron or manganese ion and chromium ion as set forth in Japanese Unexamined Patent Publication (KOKAI) No. 78265/1984.

The second step is a process of forming metallic glossy dots on the surfaces of the inorganic compound coating layer in a scattered manner. Metal such as gold, silver, copper, palladium, cobalt and the like, and alloy such as nickel-phosphorus alloy, nickel-boron alloy, nickel-cobalt-phosphorus alloy, nickel-tungsten-phosphorus alloy, silver-gold alloy, cobalt-silver alloy and the like may be employed for the metal constituting the metallic glossy dots. The metallic glossy dots are formed out of a solution containing ions of these metals or alloys by using an electroless plating.

The metallic glossy dots are formed so that they occupy from 0.05 to 95% of the surfaces of the inorganic compound coating layer with respect to the total surface area of the inorganic compound coating layer. When the total area occupied by the metallic glossy dots is less than 0.05%, no effect of the metallic glossy dots formation is appreciated, and there is no appreciable difference with respect to the plain pearl mica pigments. When the total area occupied by the metallic glossy dots is more than 95%, the transparency gets poor, the pearl-like glossiness disappears, the color hue gets monotonous, and there is no appreciable difference with respect to pearl mica pigments most of whose surfaces are coated by metal.

The third step, constituting one of major features of this invention, is a process of irradiating ultraviolet ray on particles formed by the second step. The inventors of this invention made the novel pigment, in which silver was plated on a pearl mica pigment in a scattered manner, into a paint, and formed a paint film with the paint. Then, the inventors irradiated ultraviolet rays of various wavelengths on the paint film by using a spectroscopic irradiation apparatus, and found that the yellowish color generation had faded away when irradiating the ultraviolet rays of short wavelengths in the range of from 200 to 410 nm as shown in FIG. 2. After the yellowish color generation had faded away, no discoloration or fading had occurred in the paint film any more. The inventors therefore thought of irradiating ultraviolet ray on the novel pigment before making the novel pigment into a paint. As a result of an earnest research and development, the inventors have discovered that the color hues of the novel pigments are stabilized and that the discoloration or fading thereof is prevented. The inventors have thus completed this invention.

The wavelength of the ultraviolet ray to be irradiated and the irradiation conditions depend on the novel pigment formation conditions, the qualities of the materials employed in the above-mentioned steps and so on. It is necessary to determine optimum conditions by experiments accordingly. For instance, the novel pigment in which silver is plated on the surface of a pearl mica pigment in a scattered manner, it is desirable to irradiate the ultraviolet rays of from 200 to 410 nm wavelength by the ultraviolet irradiation amount of approximately 400 joule/cm$^2$ or more as later and fully described in the preferred embodiments of this invention.

When irradiating the ultraviolet ray on the novel pigment, the ultraviolet ray may be irradiated directly on the novel pigment in a dry manner. However, it is hard to irradiate the ultraviolet ray uniformly on the entire surfaces of the novel pigment even if the novel pigment is stirred as it is or put in a fluidized bed. This disadvantage results from the fact that the novel pigment is in a form of powder. In addition, because the stirring process and the fluidized bed process associate with the powder handling hardships, these processes are not a desired one accordingly. Therefore, it is desirable to put the novel pigment into a suspension state in a liquid medium such as water and irradiate the ultraviolet ray while stirring the suspension. For instance, the ultraviolet ray may be irradiated on the novel pigment from the top while stirring the novel pigment and water in a container such as a beaker and the like. In this way, the ultraviolet ray transmits through the water, and irradiates the novel pigment efficiently. In this case, when a beaker made of quartz glass is employed, it is possible to irradiate the ultraviolet ray through the wall of the beaker in the horizontal direction with respect to the wall of the beaker.

Additionally, it is preferred to irradiate the ultraviolet ray on the novel pigment in a plating bath or washing water before the filteration and after the metallic glossy dots formation, because the metallic glossy dots are formed by an electroless plating. When the ultraviolet irradiation is performed in this manner, the increment in the man-hour requirement can be suppressed and the pigment production process becomes very advantageous one. In this case, the ultraviolet ray may be irradiated by the batch. The ultraviolet ray can be irradiated continuously on the novel pigment in transfer by developing the configuration of the ultraviolet lamp and the way of the ultraviolet lamp disposition. When the ultraviolet ray irradiation is performed continuously, the productivity of the pigment production process improves remarkably.

In the production process of pigment according to this invention, the ultraviolet ray is irradiated on the pigment on which the metallic glossy dots are formed in a scattered manner. Thus, the components, such as impurities and the like, have been discolored or faded away, thereby rendering the pigment stable. As a result, the color hue of the novel pigment has been stabilized, and color deviations thereof by the lot can be suppressed.

Therefore, the novel pigment having good weather resistance can be produced readily and stably by the present invention. When the metallic glossy dots formation in an electroless plating bath and the ultraviolet ray irradiation on the pigment in the elctroless plating bath are performed in succession, the increment in the man-hour requirement can be avoided and the pigment production process becomes very advantageous one.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT OF THE INVENTION

Having generally described this invention, a further understanding can be obtained by reference to certain specific preferred embodiments which are provided herein for purposes of illustration only and are not intended to be limiting unless otherwise specified.

The present invention will be hereinafter described with reference to the following preferred embodiments.

First Preferred Embodiment (The First Step)

A pearl mica pigment, i.e., Iriodin 9103 produced by Merck Co., Ltd., was prepared in which rutile type titanium dioxide is coated on the surface of the mica. The first step was therefore omitted. The titanium dioxide was coated on the surface of the mica by the production method of the second preferred embodiment set forth in West Germany Unexamined Patent Publication No. 2,522,527.

(The Second Step)

Fifteen (15) grams of the above-mentioned pearl mica pigment were suspended and stirred in 450 milliliters of distilled water in a beaker. Then, 30 milliliters of silver solution were added to the suspended solution at once at an ordinary temperature, and the suspended solution was stirred for five (5) minutes thereafter. The silver solution contained 50 grams/liter of silver nitrate and 50 milliliters/liter of 28% aqueous ammonia. Further, 20 milliliters of formalin solution was added as a reducing reagent to the suspended solution at once, and the suspended solution was thereafter stirred for 55 minutes successively. The formalin solution was prepared by adding distilled water to 9 milliliters of 35% formaldehyde aqueous solution until the total volume of 40 milliliters of formalin solution was obtained. The novel pigment thus obtained gave a bit yellowish blue-silver color. The metallic glossy dots comprising silver were deposited on the pearl mica pigment by 6.4 weight % in total, and occupied the surfaces of the pearl mica pigment by the rate of 72% with respect to the total surface area of the pearl mica pigment.

For comparison purpose, 3.2 grams of the novel pigment free from the following ultraviolet ray irradiation in the third step were filtered, washed, dried and collected. Thereafter, the novel pigment was dispersed in 86.4 grams of acrylic-melamine resin containing solid components by 45% to prepare a paint. Test pieces were coated with the paint to the thickness of 500 micrometers. The test pieces were then heated at the temperature of 130° C. for 20 minutes, thereby baking and drying the coated test pieces. The color hues of the paint films thus obtained were evaluated with a color-difference meter made by Suga Shikenki Co., Ltd. The results of the evaluation are set forth in Hunter's "Lab" value in Table 1. Next, the paint films were subjected to an accelerated weather resistance test using a QUV apparatus for 500 hours, and the color hues of the paint films after the test were evaluated similarly. The differences between the color hue values obtained before and after the test are also set forth in Table 1.

(The Third Step)

Figure 1:
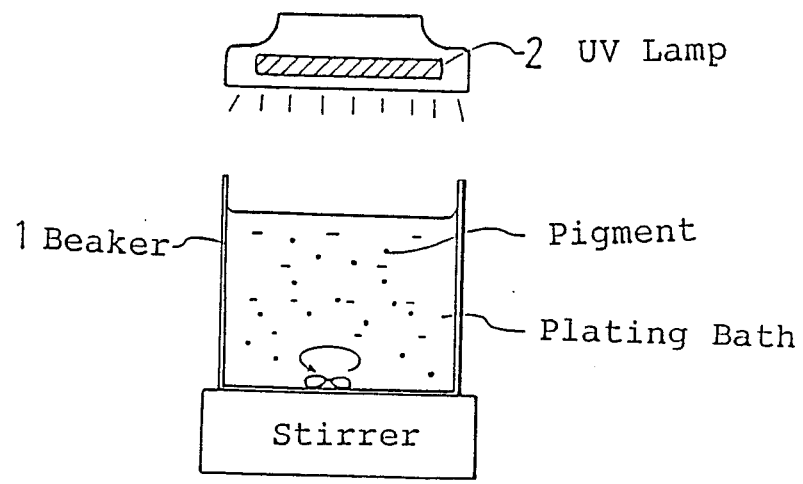
FIG. 1 is a schematic illustration on how the third step of the pigment production process according to this invention is performed.
Figure 2:
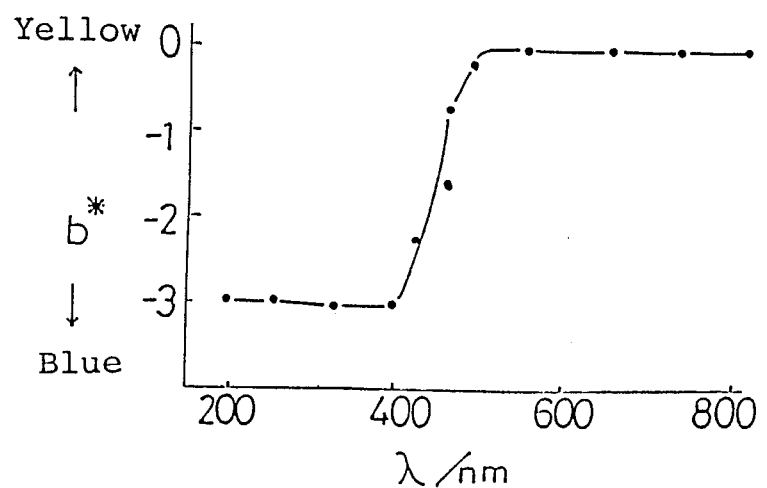
FIG. 2 is a graph showing the relationship between the wavelengths of ultraviolet rays and the "b" values of paint films comprising the novel pigments after the ultraviolet irradiation.
Figure 3:
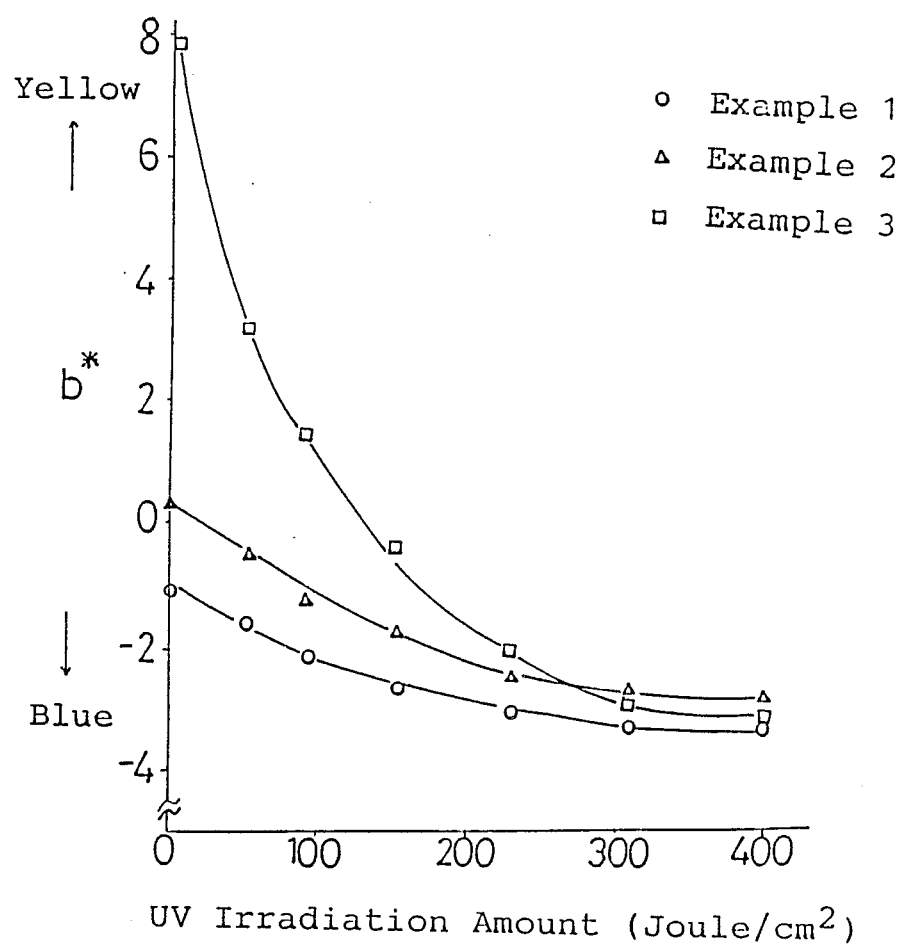
FIG. 3 is a graph showing the relationships between the ultraviolet irradiation amounts and the "b" value variations of paint films comprising the novel pigments after the ultraviolet irradiation.

The novel pigment was kept in the state which the second step had been just completed, and in the state which the novel pigment had been suspended in the plating bath. Ultraviolet rays were then irradiated on the novel pigment from 10 cm above the top of the beaker 1 with an ultraviolet lamp 2 while stirring the suspended solution as illustrated in FIG. 1. The ultraviolet lamp 2 was made by Funakoshi Co., Ltd. and the output was 400W. The pigment was collected when the ultraviolet irradiation amount reached 50, 90, 150, 230, 310 and 400 joule/cm$^2$, respectively. The pigments thus collected were then made into paints in the above-mentioned manner. Similarly, the paints were coated on the test pieces, the paint films were subjected to the accelerated weather resistance test, and the color hues of the paint films before and after the test were evaluated. The differences between the color hue values obtained before and after the test are also set forth in Table 1. Further, the relationship between the ultraviolet irradiation amounts and the "b" values before the accelerated weather resistance test are illustrated in FIG. 3. By the way, it took approximately 48 hours to irradiate the ultraviolet ray up to the ultraviolet irradiation amount of 400 joule/cm$^2$ under the conditions of this experiment.

(Evaluation)

It is apparent from Table 1 and FIG. 3 that the yellowish color generation of the pigments had reduced as the ultraviolet irradiation amount increased, and that the discoloration or fading thereof after the accelerated weather resistance test had reduced. When the ultraviolet ray was irradiated on the novel pigment by 400 joule/cm$^2$, the novel pigment gave a blue-silver color with the yellowish color generation faded away, and the "b" value variation thereof after the accelerated weather resistance test was −0.09, and was a remarkably small value. It is understood consequently that the novel pigment would hardly discolor or fade away.

Second Preferred Embodiment

The production process described in the "First Preferred Embodiment" section was performed again. Similarly, the novel pigments thus obtained were made into paints, the paints were coated on the test pieces, the paint films were subjected to the accelerated weather resistance test, and the color hues of the paint films before and after the test were evaluated. The results of the evaluation are set forth in Table 1 and FIG. 3.

The novel pigments of this preferred embodiment, produced by the second step according to this invention and free from the effect of the ultraviolet irradiation, gave a yellowish color generation much stronger than those of the First Preferred Embodiment did before the ultraviolet irradiation. However, the novel pigments of this preferred embodiment gave color hues substantially equivalent to the color hues of the novel pigments of the First Preferred Embodiment after the ultraviolet irradiation. Similarly to the First Preferred Embodiment, the magnitude of the reduction of the yellowish color generation before and after the accelerated weather resistance test had reduced as the ultraviolet irradiation amount increased. The novel pigment irradiated by the ultraviolet ray up to the ultraviolet irradiation amount of approximately 400 joule/cm$^2$ gave a blue-silver color, and was superior in the weather resistance property.

Third Preferred Embodiment

In this preferred embodiment, the 20 milliliters of formalin solution was added to the suspended solution at the rate of 0.5 milliliters/minute in the second step instead of adding the formalin solution at once. Other than this arrangement, this preferred embodiment was identical with the First Preferred Embodiment. Similarly to the First Preferred Embodiment, the novel pigments thus obtained were made into paints, the paints were coated on the test pieces, the paint films were subjected to the accelerated weather resistance test, and the color hues of the paint films before and after the test were evaluated. The results of the evaluation are set forth in Table 1 and FIG. 3.

The novel pigments of this preferred embodiment, produced by the second step according to this invention and free from the effect of the ultraviolet irradiation, gave the strongest yellowish color generation before the ultraviolet irradiation among the First, Second and Third Preferred Embodiments. However, the novel pigments of this preferred embodiment gave color hues substantially equivalent to the color hues of the novel pigments of the First and Second Preferred Embodiments after the ultraviolet irradiation. Similarly to the First and Second Preferred Embodiments, the magnitude of the reduction of the yellowish color generation before and after the accelerated weather resistance test had reduced as the ultraviolet irradiation amount increased. The novel pigment irradiated by the ultraviolet ray up to the ultraviolet irradiation amount of approximately 400 joule/cm$^2$ also gave a blue-silver color, and was superior in the weather resistance property.

TABLE 1

| Sample I.D. | | Color Hue | | | QUV (500H) | | |
|---|---|---|---|---|---|---|---|
| | | L | a | b | ΔL | Δa | Δb |
| Example 1 | Without UV Irradiation | 28.21 | −2.25 | −1.10 | −0.10 | 0.38 | −1.00 |
| | With UV Irradiation (50 joule/cm$^2$) | 27.92 | −2.26 | −1.16 | −0.10 | 0.22 | −0.57 |
| | With UV Irradiation (90 joule/cm$^2$) | 27.58 | −2.18 | −2.18 | 0.10 | −0.39 | −0.69 |
| | With UV Irradiation (150 joule/cm$^2$) | 27.20 | −2.20 | −2.70 | 0.00 | −0.01 | −0.34 |
| | With UV Irradiation (230 joule/cm$^2$) | 26.55 | −2.17 | −3.13 | 0.10 | −0.01 | −0.50 |
| | With UV Irradiation (310 joule/cm$^2$) | 26.17 | −2.16 | −3.39 | −0.10 | 0.01 | −0.22 |
| | With UV Irradiation (400 joule/cm$^2$) | 26.02 | −2.18 | −3.43 | −0.10 | −0.01 | −0.09 |
| Example 2 | Without UV Irradiation | 28.38 | −3.11 | 0.32 | −0.10 | 0.41 | −1.01 |
| | With UV Irradiation (50 joule/cm$^2$) | 28.10 | −3.18 | −0.51 | 0.00 | 0.41 | −0.89 |
| | With UV Irradiation (90 joule/cm$^2$) | 27.81 | −3.10 | −1.28 | 0.10 | −0.42 | −0.68 |
| | With UV Irradiation (150 joule/cm$^2$) | 27.52 | −2.74 | −1.72 | 0.10 | −0.01 | −0.50 |
| | With UV Irradiation (230 joule/cm$^2$) | 26.73 | −2.73 | −2.51 | −0.10 | 0.01 | −0.33 |
| | With UV Irradiation (310 joule/cm$^2$) | 26.51 | −2.74 | −2.71 | 0.10 | −0.01 | −0.32 |
| | With UV Irradiation (400 joule/cm$^2$) | 26.33 | −2.76 | −2.90 | 0.00 | 0.01 | −0.11 |
| Example 3 | Without UV Irradiation | 28.41 | −1.56 | 7.80 | −0.67 | 0.08 | −1.16 |
| | With UV Irradiation (50 joule/cm$^2$) | 28.19 | −1.95 | 3.10 | −0.58 | 0.47 | −1.40 |
| | With UV Irradiation (90 joule/cm$^2$) | 27.98 | −1.10 | 1.39 | −0.59 | 0.07 | −1.76 |
| | With UV Irradiation (150 joule/cm$^2$) | 27.93 | −1.90 | −0.38 | −0.20 | −0.39 | −0.69 |
| | With UV Irradiation (230 joule/cm$^2$) | 27.68 | −2.27 | −2.10 | 0.00 | 0.00 | −0.17 |
| | With UV Irradiation (310 joule/cm$^2$) | 27.22 | −2.29 | −3.01 | 0.29 | −0.44 | −0.14 |
| | With UV Irradiation (400 joule/cm$^2$) | 26.97 | −2.30 | −3.19 | 0.10 | −0.03 | −0.14 |

It is therefore apparent from the results of the evaluation on the above-mentioned preferred embodiments that the color hue deviation has been suppressed and the pigment of the good weather resistance property can be produced by the pigment production process of this invention. It is readily understood that the advantages have resulted from the third step, in which the ultraviolet ray is irradiated.

Having now fully described the invention, it will be apparent to one of ordinary skill in the art that many changes and modifications can be made thereto without departing from the spirit or scope of the invention as set forth herein.

What is claimed is:

1. A process for the production of a pigment comprising the steps of:
   a first step of forming an inorganic compound coating layer on the entire surface of particles of a scaly substrate made of ceramic;
   a second step of forming metallic glossy dots on the surface of said inorganic compound coating layer in a scattered manner by an electroless plating, and said metallic glossy dots occupying from 0.05 to 95% of the surface of said inorganic compound coating layer with respect to the total surface area of said inorganic compound coating layer; and
   a third step of irradiating the particles formed in said second step with ultra violet rays.

2. The process according to claim 1, wherein said particles formed in said second step are suspended in a fluid medium and irradiated with ultraviolet rays while stirring the suspended particles in said third step.

3. The process according to claim 2, wherein said particles formed in said second step are suspended in at least one of a plating bath and a washing water and irradiated with ultraviolet rays in said third step.

4. The process according to claim 1, wherein said substrate employed in said first step is selected from the group consisting of mica and molybdenum sulfide.

5. The process according to claim 4, wherein said substrate employed in said first step is mica and is selected from the group consisting of natural mica and synthetic mica.

6. The process according to claim 5, wherein said mica is natural mica and is selected from the group consisting of muscovite, biotite, and phlogopite.

7. The process according to claim 1, wherein said substrate employed in said first step has a size in the range of from 500 to 1000 angstroms in thickness and form 3 to 50 micrometers in length.

8. The process according to claim 1, wherein said inorganic compound coating layer formed in said first step comprises at least one inorganic compound selected form the group consisting of titanium dioxide, iron oxide, aluminum hydroxide, chromium hydroxide, and chromium phosphate.

9. The process according to claim 1 wherein said metallic glossy dots formed in said second step are formed of at least one metal selected form the group consisting of gold, silver, copper, palladium, cobalt, nickel-phosphorous alloy, nickel-boron alloy, nickel-cobalt-phosphorous alloy, nickel-tungsten-phosphorous alloy silver-gold alloy, and cobalt-silver alloy.

10. The process according to claim 4, wherein said substrate employed in said first step comprises mica, said inorganic compound coating layer formed in said first step comprises titanium dioxide, said metallic glossy dots formed in said second step comprises silver, said ultraviolet rays employed in said third step have a wavelength in the range of from 200 to 410 nm, and the amount of the ultraviolet irradiation is 400 joule/cm$^2$ or more in said third step.

* * * * *